Sept. 29, 1964     S. O. ROSENQVIST ETAL     3,150,980
METHOD OF CONCENTRATING FERMENTED YEAST SUSPENSION
Filed Dec. 28, 1961
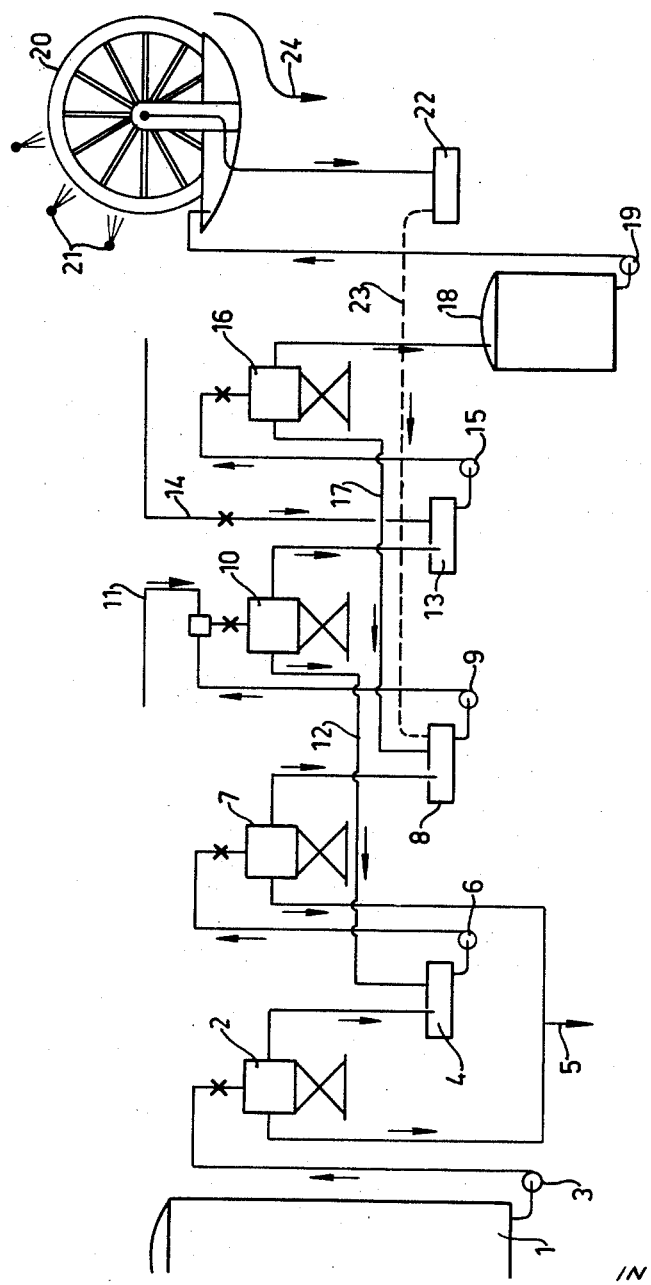
INVENTORS.
SVEN OLOF ROSENQVIST,
INGVAR OSKAR VALLENTIN LUNDIN
and ERIK RAYMOND EGNELL
BY Albert M. Parker
ATTORNEY.

United States Patent Office 3,150,980
Patented Sept. 29, 1964

3,150,980
METHOD OF CONCENTRATING FERMENTED YEAST SUSPENSION
Sven Olof Rosenqvist, Rotebro, Ingvar Oskar Vallentin Lundin, Norrviken, and Erik Raymond Egnell, Sollentuna, Sweden, assignors to Aktiebolaget S.J.A., Stockholm, Sweden, a corporation of Sweden
Filed Dec. 28, 1961, Ser. No. 162,714
3 Claims. (Cl. 99—96)

In the manufacture of, for example, press yeast (bakers' yeast), the completely fermented wort or yeast suspension coming from the fermenting vats is as a rule concentrated in one or more steps, for example in separators, water being added to wash the yeast. After this the yeast suspension is filtered in a filter, for example a continuous drum filter, on which washing can take place. It has also been proposed to reduce the water content in the yeast cells by treating the yeast with an osmotically active substance, for example a suitable electrolyte such as a sodium chloride solution, sodium sulphate solution or magnesium chloride solution, whereby, owing to the osmotic pressure, part of the water or liquid within the yeast cells will pass out of the yeast cells, so as to be removed and replaced by stronger electrolyte so that the total water content is reduced. The diluted electrolyte solution which is thus forced out of the cells can be washed out by clean water, which can be removed by filtration, for example on a continuous filter.

According to the present invention it has been discovered that substantial improvements may be achieved if the yeast suspension after it having been treated with the osmotically active substance or substances is subjected to separation, whereby a proportion of the water and the substances which have been expelled from the yeast cells during the osmotic treatment will be removed before the yeast suspension is filtered. Particularly if a rotating pressure or suction filter is used, it is advantageous to return the saline liquid obtained during the separation and/or filtration to an earlier washing step so as to be there added to the yeast concentrate which is being washed. To this yeast concentrate there may possibly be added washing water immediately before the separation.

The advantages achieved by means of the present invention are firstly that the separation to which the yeast suspension is subjected after treatment with the osmotically active substances restores the yeast suspension to its original or higher concentration and thus removes the intercellular water, which owing to the treatment has been expelled from the cells so as to dilute the concentration. Without the proposed separation the capacity in the filtration is reduced to such an extent that the method of treating yeast with osmotically active substances can hardly be performed under certain circumstances.

Another important advantage is that the substances which are expelled from the cells with the intercellular water are largely removed by the separation according to the invention. The presence of these substances blocks the filter cloth of the vacuum dehydrator and renders impossible further separation after a short period of operation.

According to one method of performing the invention the saline liquid obtained during the separation and/or filtration may be returned to an earlier washing stage and there added to the yeast concentrate. This method is of great significance for limiting salt consumptoin since the saline solution from the separation and filtration may be returned and utilised without the harmful substances from the contents of the cells impairing the filtration result since in the subsequent separation these substances are again removed and thus do not accompany the yeast concentrate.

The invention may either completely or in part be combined with the method described in U.S. Patent No. 2,947,668 or British Patent 763,926, but the invention is not restricted to this.

One embodiment of a plant for performing the process according to the invention is shown diagrammatically on the accompanying drawing.

The yeast suspension, containing about 10% of yeast calculated as 25-percent yeast, is supplied by means of a pump 3 from a fermenting vat 1 to a separator 2, in which part of the water is removed and discharged through an outlet 5. Washing of the concentrated suspension is effected in a first washer 4 and by means of a pump 6 the washed concentrate is supplied to a first washing separator 7 from which the separated liquid is discharged through the outlet 5 while the concentrate flows to a first salt treatment container 8 and therefrom through a pump 9 to a second washing separator 10. To this separator water is added through a conduit 11 while the separated liquid flows through conduit 12 to the first washer 4 to serve as washing liquid. The concentrated yeast suspension from separator 10 is conducted to a second salt treatment container 13 to which salt solution is supplied through a conduit 14. From the container 13 the salt treated yeast concentrate is supplied through a pump 15 to a separator 16 in which the yeast suspension (yeast cream) is concentrated further and the liquid forced out of the yeast cells. The liquid, containing salt solution is returned through conduit 17 to the first salt treatment container 8 while the concentrated yeast cream is supplied to a collecting container 18 and from there through a pump 19 to a rotating filter 20 in which the yeast suspension is filtered under the action of vacuum from a vacuum pump 22 and washed by being sprayed from nozzles 21. The liquid removed in the filter 20 may, if desired be returned to the first salt treatment container 8 through a conduit 23 while the filtered yeast is removed from the filter at 24.

By means of the salt treatment the yeast concentration of the yeast concentrate is changed on account of the intercellular water forced out from the yeast cells and the lower concentration would result in a reduced capacity of the vacuum filter unless the additional separation step 16 were provided for concentrating the yeast suspension before the filtration.

In normal operation, i.e. without utilizing the present invention, the yeast suspension from separator 10 will have a concentration of about 65–75% calculated on yeast having 25% of dry substances. By the salt solution treatment according to the invention the concentration of yeast will be reduced to about 55–60% if the concentration of salt is 1–1.5% and to about 40–45% at a salt concentration of about 3% calculated on the amount of concentrate. To some extent the change of concentration depends on the type of yeast used. In separator 16 through which the yeast concentrate, having added thereto the osmotically acting salt solution is caused to pass, the liquid and substances forced out of the yeast cells as well as the water possibly used in preparing the salt solution (also dry salt may be added to the concentrate) are separated from the yeast.

Due to the fact that the yeast concentration of the concentrate supplied to the filter is increased from about 50% or lower to 70% or somewhat more (depending on the contents of salt) the capacity of the filter will be increased to a double or a three-folded value compared with operation without treatment according to the invention. It will be apparent from the above that separator 16 removes or separates a large proportion of the liquid from the solids of the suspension; such separated or removed liquid includes as a large proportion thereof the liquid and the colloids contained therein which were forced out of the yeast cells during the osmotic treatment of such cells. The yeast obtained on the filter 20 has a dry-substance content of about 25–32%.

By returning the liquid separated in separator 16 to the first salt treatment container 8 the consumption of salt may be reduced. Returning the liquid from the filter 20 serves the same purpose. An improved utilization of the salt is obtained due to the fact that before the addition of water through conduit 11 the yeast concentrate has a lower volume and thus higher contents of salt, which is reduced by being diluted with washing water. The salt containing washing liquid from separator 10 is utilized as washing liquid in separator 7 according to the countercurrent principle.

All percents are calculated as percent by weight.

What we claim is:

1. In the manufacture of yeast a method of concentrating fermented yeast suspension comprising the steps of first treating the yeast slurry with an osmotically active substance so as to force liquid out of the yeast cells, then, as an intermediate step, separating at least part of the liquid and colloids contained therein forced out of the yeast cells during the osmotic treatment from said suspension and finally filtering the suspension thus separated from said liquid to filtrate the solids from said suspension to concentrate the yeast.

2. In the manufacture of yeast a method of concentrating fermented suspension comprising the steps of concentrating the yeast slurry in a separator, adding water to the separator to wash the suspension, then treating the yeast suspension with an osmotically active substance so as to force liquid out of the yeast cells, next, as an intermediate step, separating at least part of the liquid and colloids contained therein forced out of the yeast cells during the osmotic treatment from said suspension, returning the separated part of said liquid forced out of the yeast cells to said separator and finally filtering the suspension thus separated from said liquid to filtrate the solids from said suspension to concentrate the yeast.

3. In the manufacture of yeast a method of concentrating fermented yeast suspension comprising the successive steps of first washing the yeast suspension with water, next treating the washed suspension with an osmotically active substance so as to force liquid out of the yeast cells, then, as an intermediate step, separating a large proportion of the liquid and colloids contained therein forced out of the yeast cells during the osmotic treatment from said suspension, then adding said liquid forced out of the yeast cells to the water for washing said yeast suspension and diluting said suspension with washing water, finally filtering the suspension thus separated from said liquid so as to filtrate the solids from said suspension to concentrate the yeast, and utilising filtered liquid separated from said solids in such final filtering in an earlier washing step.

References Cited in the file of this patent

UNITED STATES PATENTS

| | | |
|---|---|---|
| 1,420,557 | Klein | June 20, 1922 |
| 1,642,537 | Brown | Sept. 13, 1927 |

OTHER REFERENCES

Cook: The Chemistry and Biology of Yeasts, Academic Press, Inc., New York, 1958, pages 229–231.

Porter: Bacterial Chemistry and Physiology, John Wiley & Sons, Inc., New York, 1946, pages 208–217.